(12) United States Patent
Katabe

(10) Patent No.: US 6,258,262 B1
(45) Date of Patent: Jul. 10, 2001

(54) FILTER OF PROCESSING VOLUME RATIO ADAPTED SCREW PRESS TYPE

(75) Inventor: Toyokazu Katabe, Kyoto (JP)

(73) Assignee: Terra Separator Co., Ltd., Kyoto (JP)

( * ) Notice: Subject to any disclaimer, the term of this patent is extended or adjusted under 35 U.S.C. 154(b) by 0 days.

(21) Appl. No.: 09/445,412

(22) PCT Filed: Apr. 9, 1998

(86) PCT No.: PCT/JP98/01648

§ 371 Date: Dec. 8, 1999

§ 102(e) Date: Dec. 8, 1999

(87) PCT Pub. No.: WO99/52704

PCT Pub. Date: Oct. 21, 1999

(51) Int. Cl.$^7$ ................................................. B01D 35/20
(52) U.S. Cl. .................... 210/174; 210/350; 210/383; 210/402; 100/116
(58) Field of Search .................... 210/350, 351, 210/383, 384, 407, 408, 413, 414, 415, 174, 402; 100/112, 116, 117

(56) References Cited

U.S. PATENT DOCUMENTS

| 3,585,924 | * | 6/1971 | Nolan | 210/415 |
| 3,780,645 | * | 12/1973 | Farmer | 100/117 |
| 3,802,566 | * | 4/1974 | Hata | 210/174 |
| 4,041,854 | * | 8/1977 | Cox | 100/112 |
| 4,266,473 | * | 5/1981 | Hunt et al. | 100/117 |
| 4,271,754 | * | 6/1981 | Homann | 100/117 |
| 4,838,995 | * | 6/1989 | Kalusen | 210/209 |
| 5,160,428 | * | 11/1992 | Kuri | 210/107 |

FOREIGN PATENT DOCUMENTS

| 48-95657 | 12/1973 | (JP) . |
| 54-112570 | 9/1979 | (JP) . |
| 63-65364 | 12/1988 | (JP) . |
| 4-4997 | 1/1992 | (JP) . |

* cited by examiner

*Primary Examiner*—John Kim
(74) *Attorney, Agent, or Firm*—Armstrong, Westerman, Hattori, McLeland & Naughton, LLP

(57) ABSTRACT

A screw press type filter which comprises an alternately superposed arrangement of annular fixed plates (10) and annular movable plates (11), a filter cylinder (2) defining a fixed cylindrical space (12) by a row of openings of the fixed plates with both end portions of a screw (5) passed through this cylindrical space extending to inlet and outlet chambers (1, 3), and mechanisms (15, 16) for turning the movable plates in accordance with the rotation of the screw also provided, wherein the volumes of the spaces between adjacent ridges of the screws in the filter cylinder are reduced gradually from an inlet toward an outlet so that such a volume decrease corresponds to a gradual decrease in the water content of an object material being processed.

3 Claims, 4 Drawing Sheets

FILTER OF PROCESSING VOLUME RATIO ADAPTED SCREW PRESS TYPE

TECHNICAL FIELD

The present invention relates to a screw press type filter for filtering raw water containing sludge and other suspensions to separate it into filtrate and dehydrated cake.

BACKGROUND ART

As for conventional screw press type filters, there is, for example, a through-screw type filter cylinder system, as disclosed in Japanese Patent Publication No. SHO 63-65364 (U.S. Pat. No. 1,520,106). A filter of this system comprises a drum, a filter cylinder installed in a substantial length excluding the opposite ends of the drum for filtering raw water to separately migrate the water content thereof radially from inside to outside of the drum, a number of through-holes formed in the peripheral surface of the drum in said substantial length, a screw installed throughout the length of the drum to extend through said filter cylinder, the spaces within said drum at the opposite ends thereof being used as an inlet chamber for raw water and an outlet chamber for dehydrated cake. The filtration passage in the filter cylinder is defined by small clearances between alternating annular fixed and movable plates that constitute said cylinder.

In the above arrangement, normally as the water content is pressed out from the clearances between the plates toward the outer periphery of the filter cylinder, the volume of an object material to be processed (the residue remaining after the pressing of the raw water) that is pressed against the screw vanes corresponding to one pitch is progressively reduced according to the amount of water pressed out. In contrast thereto, in the usual construction wherein the volume ratio (processing volume/unit length) and the screw pitch are constant throughout the length of the filter cylinder, the screw load becomes lighter as the rear end of the filter cylinder is approached, resulting in the rear end of the screw feeding no substantial load.

DISCLOSURE OF THE INVENTION

An object of the present invention is to provide a screw press wherein the processing capacity per screw pitch of the filter cylinder (volume/screw pitch) is progressively reduced over a region ranging from the inlet to the outlet, according to the amount of an object material processed per pitch of the screw normally decreasing, as the object material is pushed to move in a filter cylinder to press out its water content.

To achieve the above object, the invention provides a screw press type filter comprising:

a) a filter cylinder including an alternately superposed arrangement of a number of annular fixed plates each having an inner diameter, and a number of annular movable plates each having an inner diameter slightly larger than the inner diameter of said fixed plates and capable of shaking in the same plane with an amplitude corresponding to a difference between the respective inner diameters of said fixed and movable plates, with small filtration clearances defined therebetween, said filter cylinder having a fixed cylindrical space defined by the series of openings in said fixed plates; and b) a screw installed in the cylindrical space of said filter cylinder to extend therethrough, with a mechanism provided for shaking said movable plates by rotation of the screw, whereby raw water fed in through an inlet port in an inlet end of said filter cylinder is pushed or propelled toward an outlet port in an outlet end thereof while said filtration clearances between the plates are always reproduced by the shaking movement of the movable plates;

c) said screw press type filter being characterized in that processing volume per screw pitch of said filter cylinder is progressively reduced over a region ranging from the inlet end to the outlet end.

In the above arrangement, there are three systems of means for progressively reducing the processing volume per screw pitch over a region ranging from the inlet end to the outlet end: ① means for progressively reducing the pitch of the screw over a region ranging from the inlet end to the outlet end of said filter cylinder, ② means for progressively increasing the shaft diameter of the screw over a region ranging from the inlet end to the outlet end of said filter cylinder, and ② means for progressively reducing the inner diameter of the filter cylinder and the projected area of the cross section of the screw corresponding thereto over a region ranging from the inlet end to the outlet end of said filter cylinder.

In a screw press filter according to the invention in which the processing volume per screw pitch of the filter cylinder is progressively reduced over a region ranging from the inlet end to the outlet end according to one of said three systems, the processing amount per screw pitch of an object material which is subjected to gradual water press-out to become harder is gradually accordingly reduced, whereby the distribution of the load on the screw is made uniform to ensure efficient water press-out throughout the length of the filter cylinder.

BRIEF DESCRIPTION OF THE DRAWINGS

A screw press type filter of a preferred embodiment according to the invention will be described with reference to the drawings, in which.

BEST MODE FOR EMBODYING THE INVENTION

Figure 1:
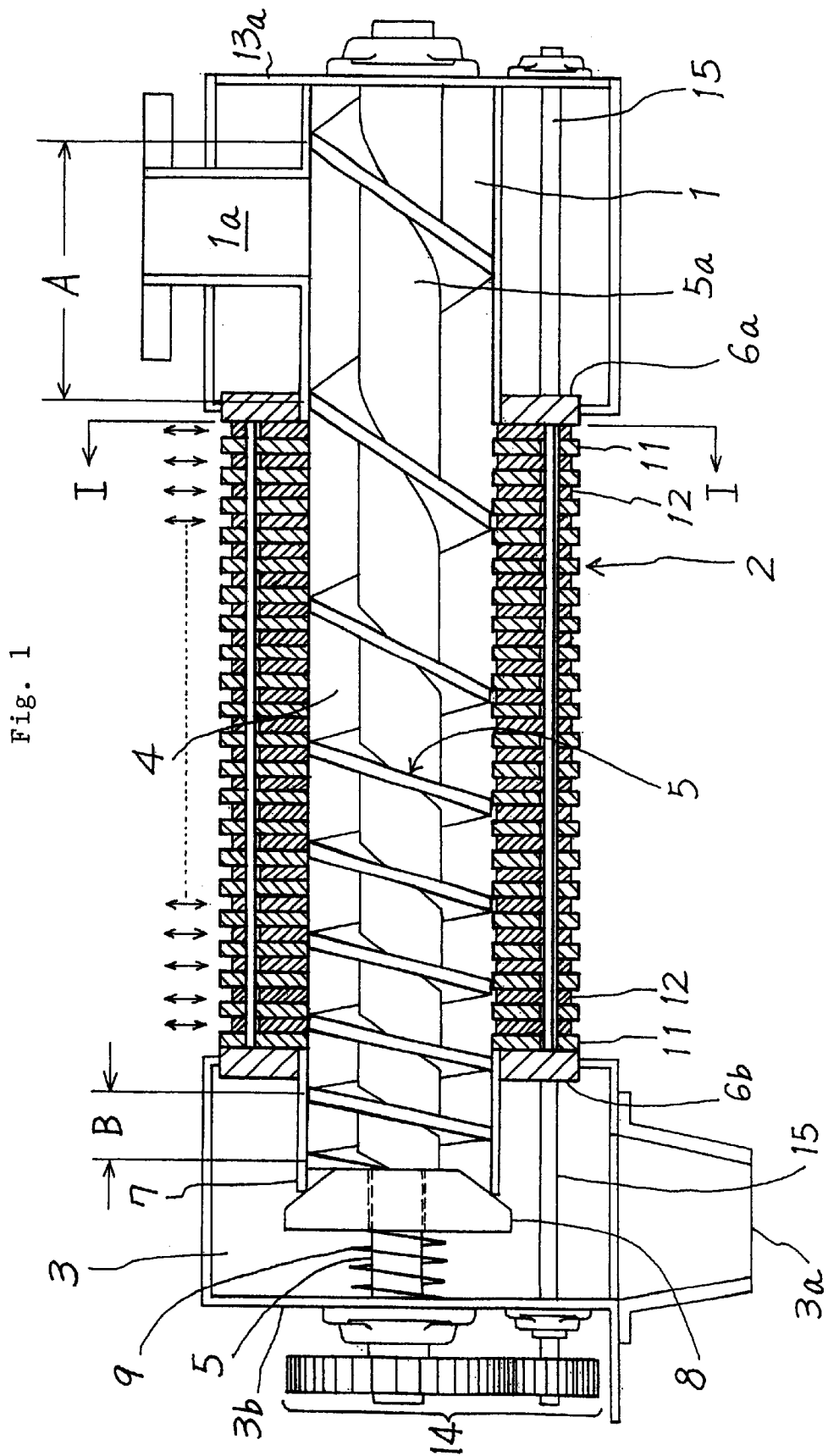
FIG. 1 is a longitudinal sectional view showing an embodiment of a press type filter of the type in which the screw pitch is progressively reduced.

A screw press type filter of a first embodiment according to the invention, as shown in FIG. 1, comprises an inlet chamber 1, a filter cylinder 2 and an outlet chamber 3 that are connected in series, as seen from the righthand in FIG. 1, wherein a screw 5 extending throughout the length of the filter from the inlet chamber 1 to the outlet chamber 3 passes through the cylindrical space 4 in the filter cylinder 2. An inlet port 1a is formed in the upper portion of the inlet chamber 1 for receiving raw water to be processed, while an outlet port 3a is formed in the lower portion of the outlet chamber 3. The screw 5 is shaped such that the pitch is continuously reduced from the pitch A of those screw vanes which are at the inlet to the pitch B (accordingly, B<A) of those screw vanes which are at the outlet, so as to be adaptable to the volume of the object material which is dehydrated to gradually decrease in volume.

The front and rear end plates 6a and 6b, respectively of the filter cylinder 2 define the boundaries of the inlet and outlet chambers 1 and 3. A rear end cylinder 7 forming an extension of the inner wall of the filter cylinder projects through the aligned opening in the rear end plate 6b. The diameter-reduced rear end shaft portion 5b of the screw shaft 5a has fitted thereon a valve disk 8 for controlling the discharge of the processed material. The valve disk 8 is supported at the back by a spring 9 installed on the rear end shaft portion 5b behind the valve disk, said spring 9 urging the valve disk 8 against the end edge of the rear end cylinder 7 and against the rear end of the screw shaft 5a (the root of the shaft portion 5b), so that the outlet of the filter cylinder 2 is closed during the downtime of the device and until the processed material is fed in under pressure after the start of the operation of the apparatus.

The filter cylinder 2 comprises a number of annular fixed plates 11 fixed in position by four support bars 10 (FIG. 2) or the like carried between the front and rear end plates 6a and 6b, and a number of annular movable plates 12 having a center opening diameter slightly larger than that of the annular fixed plates, the annular fixed and movable plates alternating with each other with slight filtration clearances defined therebetween. The movable plates 12 can be shaken in the same plane with an amplitude corresponding to the difference in bore diameter between the movable and fixed plates by a cam mechanism to be later described. In this case, the series of openings in all fixed plates 11 defines said cylindrical space 4, and there is no possibility of the movable plates 12 narrowing the inner Peripheral surface of the cylindrical space 4 due to their shaking movement. Therefore, the outer edge of the vanes of the screw 5 can snugly engage this inner peripheral surface and continuously rotate.

The front end of the screw shaft 5a and the rear end shaft portion 5b are respectively supported by bearings installed on the outer end plates 13a and 13b of the inlet and outlet chambers 1 and 3, and the rear end of the shaft portion 5b projecting out of the bearing mounted on the outer end plate 13 of the outlet chamber is driven for rotation through gears, or the like, and is operatively connected to another rotary shaft 15 by a gear train 14. As is clear from FIG. 2, the rotary shaft 15 extends below the filter and between the outer end plates 13a and 13b and is reduced in diameter along its portion located in the filter cylinder 2 and the diameter-reduced portion 15' has an axially extending cam key 16 on its peripheral surface of said diameter-reduced portion 15.

The fixed plates 11 are perfectly annular plates having outer peripheries defining the outer peripheral surface of the filter cylinder 2 and openings defining the aforesaid cylindrical space 4 and are supported by said four support bars 10 extending therethrough and are spaced from each other by spacers 17 in the form of small circular plates also supported by said support bars 10 extending therethrough. On the other hand, movable plates 12 are annular plates having an outer periphery which is somewhat smaller than that of the fixed plate 11 and which is formed with recesses 18 surrounding the spacers 17 with a sufficient margin left therearound, and an opening 19 somewhat larger in diameter than the opening in the fixed plate 11 (i.e., than the cylindrical space 4), with upper and lower holes 20a and 20b formed in the upper and lower regions of the movable plates 12, the upper holes 20a having a fulcrum bar 21 loosely fitted therein, the lower holes 20b having fitted therein the intermediate narrow diameter portion 15' of the aforesaid rotary shaft 15. The lower holes in the fixed plates 11 through which the narrow diameter portion 15' extends, as clearly seen from FIG. 1, have a diameter which corresponds to, or is greater than, the circular path of the cam key 16, whereby the fixed plates 11, in their fixed state, allow the rotation of the narrow diameter portion 15' and hence the rotary shaft 15. Further, since the aforesaid lower holes 20b in the movable plates 12 have a diameter which is slightly larger than the diameter of the narrow diameter portion 15' plus the height of the projection of the cam key 16, the movable plates 12 are cam-driven to perform an eccentric rotation as the cam key 16 is rotated, so that the movable plates 12 are shaken mainly vertically around the fulcrum bar 21 extending through the upper holes 20a.

Figure 2:
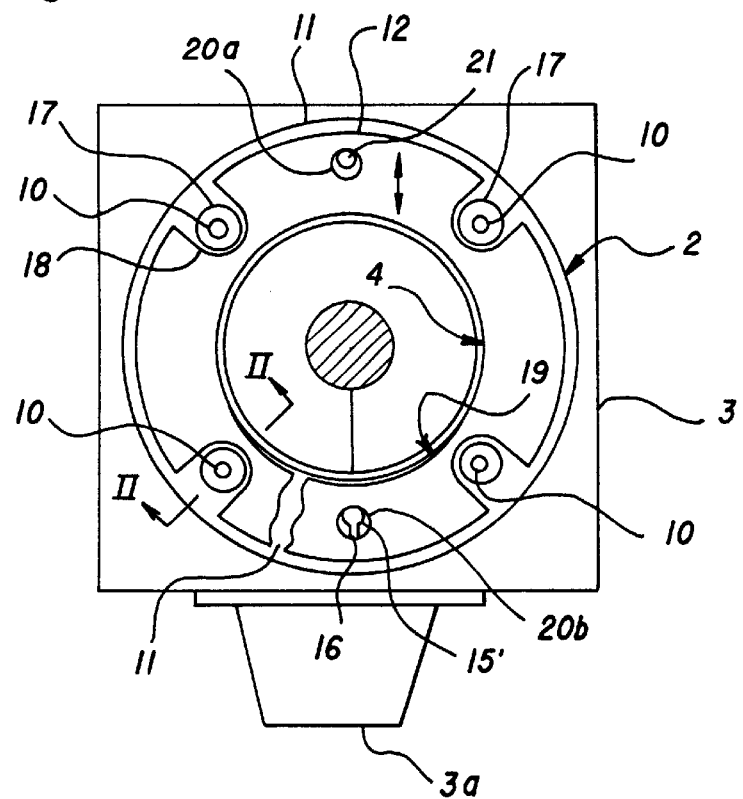
FIG. 2 is a sectional view taken in the direction of arrows I—I in FIG. 1.
Figure 3:
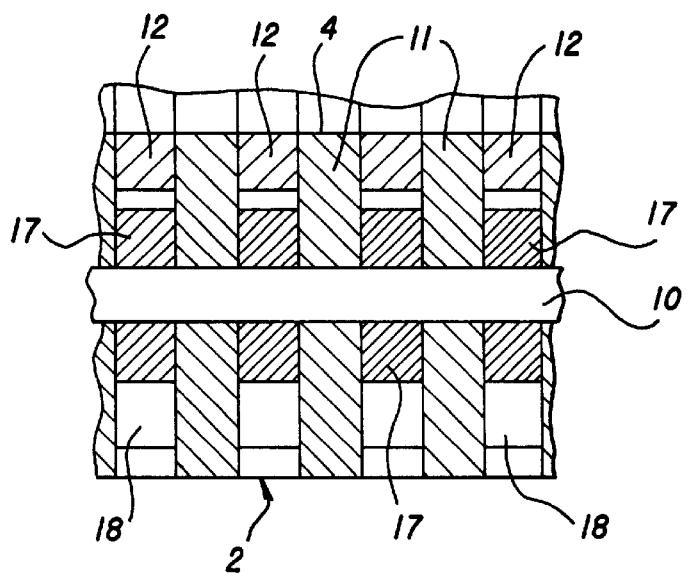
FIG. 3 is a fragmentary sectional view taken in the direction of arrows II—II in FIG. 2.

Next, as is clear from FIG. 3, which is an enlarged fragmentary section taken in the direction of arrows II—II in FIG. 2, the spacers 17 in the recesses 18 have a thickness which determines the spacing between adjacent fixed plates 10, which, in this case, is a thickness slightly larger than the thickness of the movable plates 11, with the result that a small filtration clearance is defined between adjacent plates 11 and 12; thus, the filter cylinder 2 (FIG. 1) composed of an arrangement of large numbers of plates 10 and 11 is completed.

In the construction of the first embodiment described above, when the screw 5 is driven, the rotary shaft 15 is simultaneously rotated by the gear train 14 and the rotation of the cam key 16 causes the lower holes 20b (see FIG. 2) in the movable plates 12 to perform an eccentric rotation, and attending the partial eccentric rotation, as described above, all the movable plates 12 shake within the range allowed by the float movement of the upper holes 20a around the fulcrum bar 21. In this case, the height of the cam key 16 is set to be equal to the difference in inner diameter between the fixed and movable plates 11 and 12, and the difference between the inner diameter of the small holes 20a and the diameter of the fulcrum bar 21 is set to be approximately equal thereto. Therefore, the openings 19 in the movable plates 12 are dimensioned such that in the lowermost position shown in FIG. 2, their upper edges coincide with the upper edge portions of openings in the fixed plates 11, i.e., the upper end of the inner peripheral surface of the filter cylinder 2, while in the uppermost position when the rotary shaft 15 has rotated by half a revolution, their lower edges coincide with the lower edge portions of the openings in the fixed plates 11, i.e., the lower end of the inner peripheral surface of the filter cylinder 2; thus, the movable plates 12 never get into the inside of the filter cylinder inner peripheral surface 22 during one revolution of the rotary shaft 15.

The raw water fed in through the inlet port la is propelled by the screw 5 in the inlet chamber 1 from which it is fed to the filter cylinder 2. The raw water gradually pressed by the screw 5 within the filter cylinder 2 is filtered radially through the filtration clearances, which are always (slidingly) reproduced between the movable and fixed plates 12 and 11 by the shaking of the movable plates 12, the filtrate being discharged through the outer periphery. The decrease of the water content of the object material, that is, the volume-decreasing of the object material is initially made as the compression and dehydration proceed when the object material is being advanced by the screw 5. In this embodiment, the pitch of the screw 5 is correspondingly reduced over a region ranging from the inlet chamber 1 to the outlet chamber 3. Therefore, it is possible to eliminate the drawback of the conventional apparatus that the intensity of the load of the object material on the screw 5 greatly decreases from the optimum value with advancing position so that the object material, insufficiently processed above a certain level, reaches the outlet chamber 3 and is discharged through the outlet port 3a.

Thus, in the screw press type filter in this embodiment, the amount of the raw water (the object material) corresponding to one pitch is propelled by the screw 5 having a gradually decreasing pitch, so that the volume to be processed/unit time (the processing rate) slows down as the object material moves to a downstream region. Therefore, the object material, whose sludge concentration is now increased and whose dehydration rate:pressure relationship is now lowered, can be processed for a longer period of time for further dehydration, with the result that the water content of the cake discharged through the outlet port 3a can be fully reduced.

Figure 4:
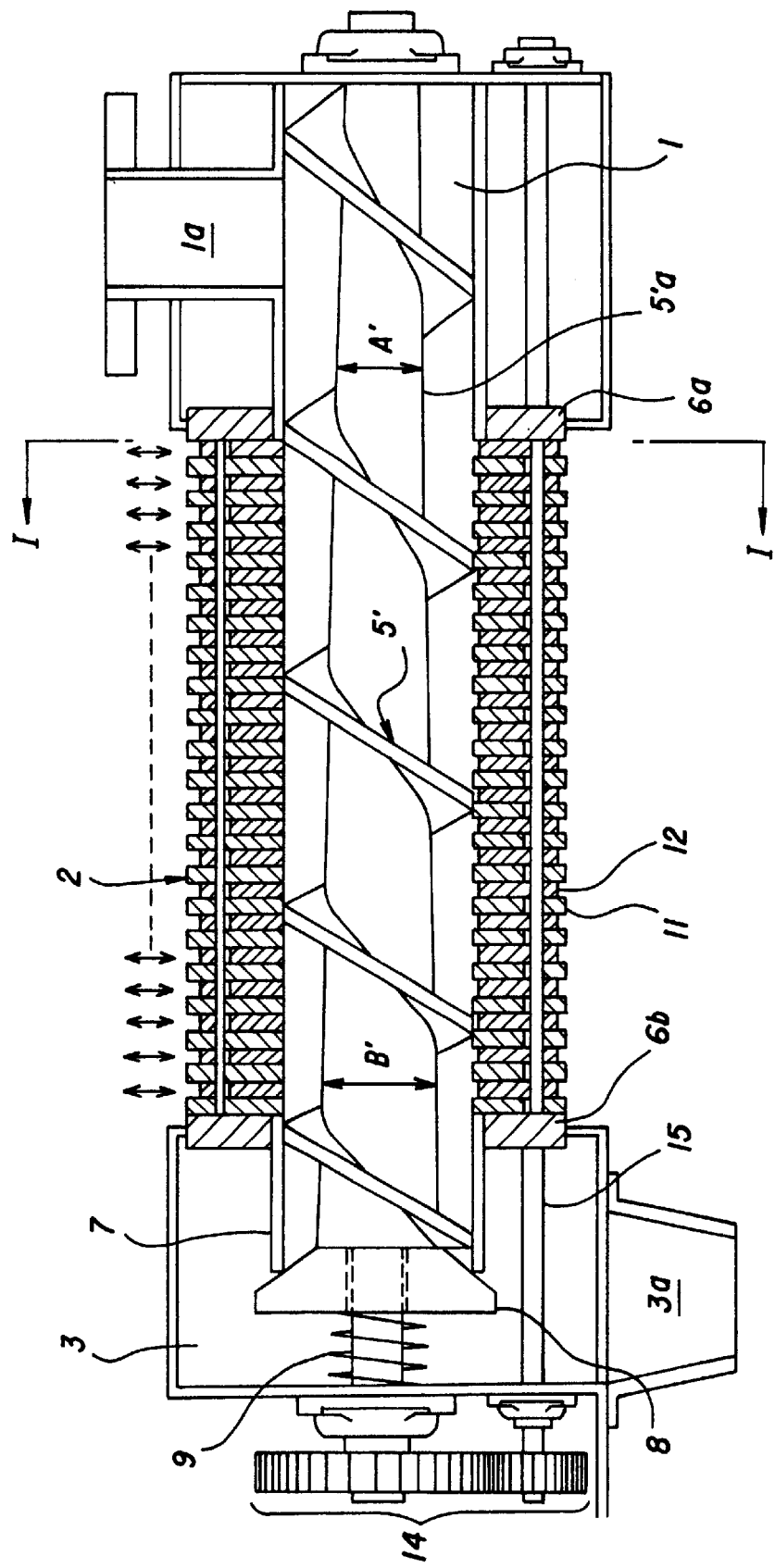
FIG. 4 is a longitudinal sectional view showing an embodiment of a screw press type filter of the system in which the screw shaft diameter is progressively increased.

FIG. 4 shows an embodiment of a filter of the type in which the screw shaft diameter is progressively increased, which is a second form of the invention. In this embodiment, there is no change in the screw pitch as in the filter shown in FIGS. 1 and 2, and instead the diameter of the shaft 5a' of the screw 5' is progressively increased over a region ranging from the inlet chamber 1 to the outlet chamber 3, for example, from the diameter A' immediately before the filter cylinder 2 to the diameter B' located short of the outlet chamber in the filter cylinder 2 (B'>A'). The rest of the arrangement is the same as in the embodiment shown in FIGS. 1 and 2, and like parts are marked with like reference numerals to omit a description thereof.

In this embodiment, the diameter of the screw shaft 5a' is increased correspondingly to a decrease in the water content of the object material, i.e., the volume of the object material in the screw pitch, which decreases over a region ranging from the inlet chamber 1 to the outlet chamber 3, whereby the volumes of the spaces between adjacent ridges of the screw are reduced. Therefore, it is possible to eliminate the drawback of the conventional device that the intensity of the load of the object material on the screw 5' greatly decreases from the optimum value with advancing position so that the object material, insufficiently processed, reaches the outlet chamber 3 and is discharged through the outlet port 3a. That is, also in the screw press type filter in this embodiment, the amount of the raw water (the object material) corresponding to one pitch is propelled by the screw 5' to be gradually brought to a position where the pitch space volume is reduced, thereby making it possible to effect further dehydration while retaining the optimum intensity of the load on the screw 5'. As a result, the water content of the cake discharged through the outlet port 3a can be sufficiently lowered.

Figure 5:
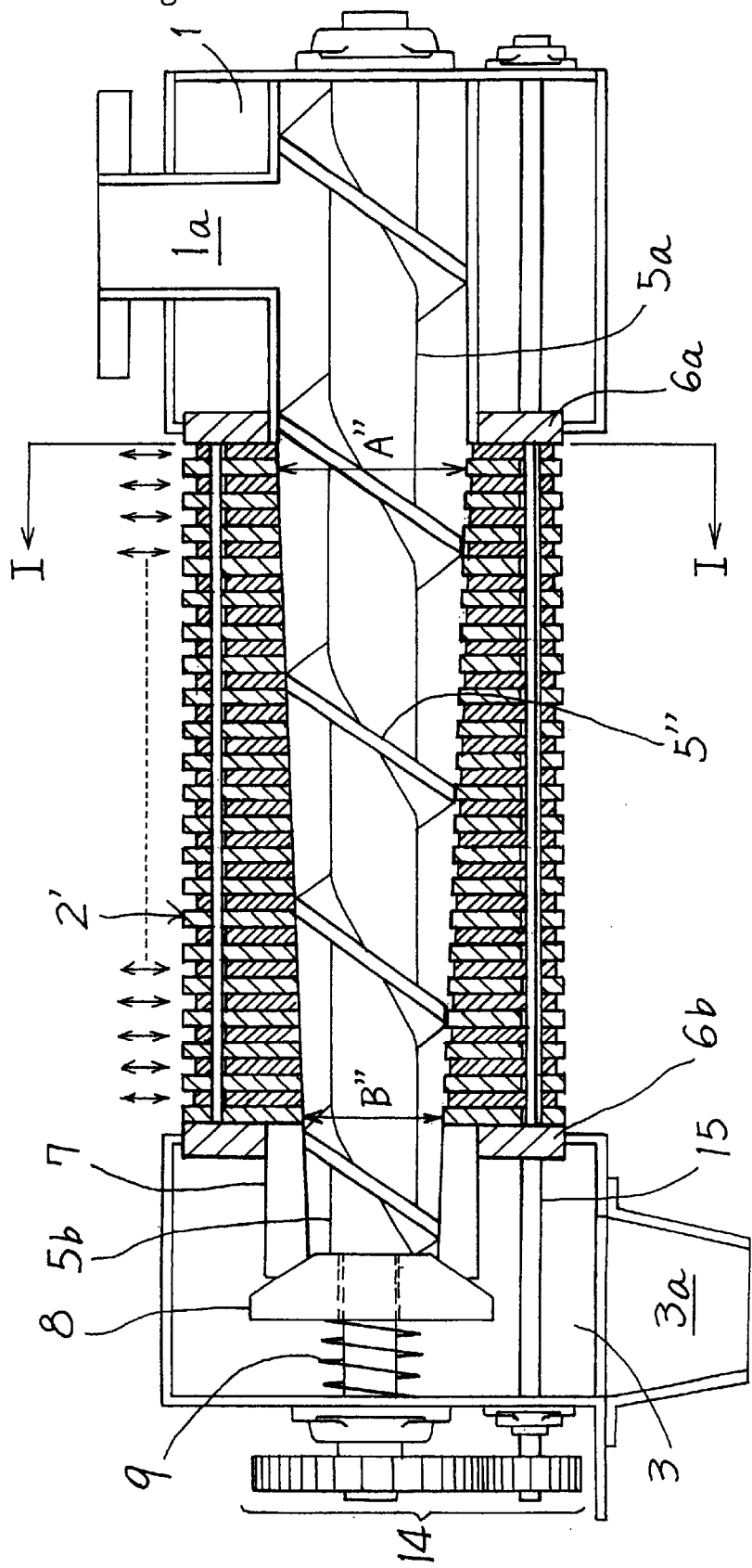
FIG. 5 is a longitudinal sectional view showing an embodiment of a screw press type filter of the system in which the inner diameter of the filter cylinder is progressively reduced.

FIG. 5 shows an embodiment of a filter of the type in which the inner diameter of the filter cylinder is progressively reduced, which is a third form of the invention. In this embodiment, rather than making a change in the screw pitch or screw shaft diameter as in the preceding embodiment, the inner diameter of the filter cylinder 2' is progressively reduced over a region ranging from the inlet chamber 1 to the outlet chamber 3, for example, from the diameter A" immediately before the filter cylinder 2 to the diameter B" located short of the outlet chamber of the filter cylinder 2 (B"<A"). Therefore, the vane diameter (projected diameter of the cross-section) of the screw 5" is correspondingly progressively reduced. The rest of the arrangement is the same as in the preceding embodiments, and like parts are marked with like reference numerals to omit a description thereof.

In this embodiment, the inner diameter of the filter cylinder 2' is reduced correspondingly to a decrease in the water content of the object material, i.e., the volume of the object material in the screw pitch, which decreases over a region ranging from the inlet chamber 1 to the outlet chamber 3, whereby the volumes of the spaces between adjacent ridges of the screw are reduced. Therefore, it is possible to eliminate the drawback of the usual type that the intensity of the load of the object material on the screw 5" greatly decreases from the optimum value with advancing position so that the object material, insufficiently processed, reaches the outlet chamber 3 and is discharged through the outlet port 3a. That is, also in the screw press type filter in this embodiment, the raw water (the object material) corresponding to one pitch is propelled by the screw 5" to be gradually brought to a position where the pitch space volume is reduced, thereby making it possible to effect further dehydration while retaining the optimum intensity of the load on the screws 5'. As a result, the water content of the cake discharged through the outlet port 3a can be sufficiently lowered.

INDUSTRIAL APPLICABILITY

As has been described so far, the present invention provides a screw press type filter in which the processing volume in the space defined by the screw pitch of the filter cylinder is gradually reduced, thereby making it possible to increase the filtration and dehydration function and keep the water content of the processed cake sufficiently low.

What is claimed is:

1. A screw press type filter comprising:

a filter cylinder including an arrangement of alternatively spaced, parallely disposed annular fixed and movable plates each having an inner diameter, the inner diameter of said movable plates being slightly greater than the inner diameter of said fixed plates, and said fixed and movable plates having small filtration clearances defined therebetween, and wherein said filter cylinder has a substantially constant cylindrical space defined by openings in said fixed plates;

an inlet port at an inlet end of said filter cylinder and an outlet port at an outlet end thereof;

a screw installed in, and extending through, the cylindrical space in said filter cylinder;

means for rotating said screw identified by a rotary drive mechanism and cam means for moving said movable plates eccentrically with respect to said fixed plates; whereby raw water fed through the inlet port of said filter cylinder is pushed toward the outlet port thereof while said filtration clearances between the plates are always reproduced by the shaking movement of the movable plates;

a valve disk opposed to a rear end of said screw installed in a rear end of said filter cylinder, which contains the outlet port thereof, for closing said outlet port until raw water to be processed is fed under pressure to said outlet port; and means for progressively reducing the pitch of the screw over a region ranging from the inlet end to the outlet end of said filter cylinder.

2. A screw press type filter as set forth in claim 1, characterized in that a shaft diameter of the screw is progressively increased over a region ranging from the end of said filter cylinder containing said inlet port to the end of said filter cylinder containing said outlet port, thereby progressively reducing the processing volume.

3. A screw press type filter as set forth in claim 1, characterized in that an inner diameter of the filter cylinder and an axially projective diameter of the cross section of the screw corresponding thereto are progressively reduced over a region ranging from the end of the filter containing the inlet port to the end thereof containing the outlet port, thereby progressively reducing the processing volume.

* * * * *